United States Patent
Wyatt

(10) Patent No.: US 9,099,050 B1
(45) Date of Patent: Aug. 4, 2015

(54) METHOD AND APPARATUS FOR DYNAMICALLY MODIFYING THE GRAPHICS CAPABILITIES OF A MOBILE DEVICE

(75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2446 days.

(21) Appl. No.: 11/843,618

(22) Filed: Aug. 22, 2007

Related U.S. Application Data

(60) Provisional application No. 60/823,429, filed on Aug. 24, 2006.

(51) Int. Cl.
  *G06F 15/16* (2006.01)
  *G06F 1/32* (2006.01)
  *G09G 5/36* (2006.01)

(52) U.S. Cl.
  CPC .............. *G09G 5/363* (2013.01); *G06F 1/3203* (2013.01)

(58) Field of Classification Search
  None
  See application file for complete search history.

(56) References Cited

U.S. PATENT DOCUMENTS

2006/0119603 A1\* 6/2006 Chen et al. ..................... 345/502
2008/0034238 A1\* 2/2008 Hendry et al. ................ 713/323

\* cited by examiner

*Primary Examiner* — Tize Ma
(74) *Attorney, Agent, or Firm* — Artegis Law Group, LLP

(57) ABSTRACT

A method and system for dynamically modifying the graphics capabilities of a mobile device is disclosed. One embodiment of the present invention sets forth a method, which includes the steps of abstracting the handling of a first graphics subsystem and a second graphics subsystem associated with the mobile device, so that the first graphics subsystem and the second graphics subsystem appear as a third graphics subsystem to an operating system for the mobile device, detecting a configuration change event corresponding to the first graphics subsystem, masking the configuration change event to induce the generation of a reset event, and modifying the graphics capabilities of the mobile device to match the highest graphics capabilities between the first graphics subsystem and the second graphics subsystem that are accessible to the mobile device.

23 Claims, 7 Drawing Sheets

METHOD AND APPARATUS FOR DYNAMICALLY MODIFYING THE GRAPHICS CAPABILITIES OF A MOBILE DEVICE

CROSS-REFERENCE TO RELATED APPLICATIONS

This application claims the benefit of U.S. Provisional Application No. 60/823,429, filed on Aug. 24, 2006.

BACKGROUND OF THE INVENTION

1. Field of the Invention

Embodiments of the present invention relate generally to graphics enhancement techniques and more specifically to a method and apparatus for dynamically modifying the graphics capabilities of a mobile device.

2. Description of the Related Art

Unless otherwise indicated herein, the approaches described in this section are not prior art to the claims in this application and are not admitted to be prior art by inclusion in this section.

Generally, mobile devices are designed to consume less power but support less than ideal graphics capabilities. However, as they offer more and more functions, an increasing number of users of these mobile devices rely on the devices to perform tasks traditionally reserved for desktop computers. For example, a notebook computer user nowadays often plays games, reads news, or even watches movies on his or her notebook computer.

To improve the viewing experience for such a user, one approach is to include a second graphics subsystem with enhanced graphics capabilities in a docking system or a graphics enhancement system (collective referred to as an "add-on system"), which the notebook computer can attach to either via a wired connection or a wireless connection. So, instead of relying on the inferior graphics subsystem inside the notebook computer, after attaching to the add-on system, the notebook computer can switch over to the second graphics subsystem to drive its internal display panel. After detaching from the add-on system, on the other hand, the notebook computer then switches back to its internal graphics subsystem.

Conventionally, switching to and away from the second graphics subsystem requires a lengthy restarting sequence. The situation is further worsened if the attachment or the removal of the add-on system is unexpected (also referred to as a "surprised attachment" or a "surprised removal" event). To illustrate, suppose an application A currently runs on a notebook computer X, and the notebook computer X is not attached to any add-on system. Then the operating system of the notebook computer X detects a surprised attachment event. In order for the application A to take advantage of the superior graphics capabilities of the second graphics subsystem in the add-on system, the user of the notebook computer X needs to manually close and re-launch the application A. If instead the operating system of the notebook computer X detects a surprised removal event indicative the removal of the add-on system, then the notebook computer X necessarily needs to go through the sequence of shutting down and rebooting to switch back to its internal graphics subsystem. These required re-launching and rebooting sequences are cumbersome and time consuming.

As the foregoing illustrates, what is needed is an improved way of dynamically and seamlessly modifying the graphics capabilities of a mobile device and address at least the problems set forth above.

SUMMARY OF THE INVENTION

A method and system for dynamically modifying the graphics capabilities of a mobile device is disclosed. One embodiment of the present invention sets forth a method, which includes the steps of abstracting the handling of a first graphics subsystem and a second graphics subsystem associated with the mobile device, so that the first graphics subsystem and the second graphics subsystem appear as a third graphics subsystem to an operating system for the mobile device, detecting a configuration change event corresponding to the first graphics subsystem, masking the configuration change event to induce the generation of a reset event, and modifying the graphics capabilities of the mobile device to match the highest graphics capabilities between the first graphics subsystem and the second graphics subsystem that are accessible to the mobile device.

One advantage of the disclosed method and system is the seamless switching of graphics capabilities from one graphics subsystem to another in a mobile device without needing to go through the lengthy restart or reboot sequences.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
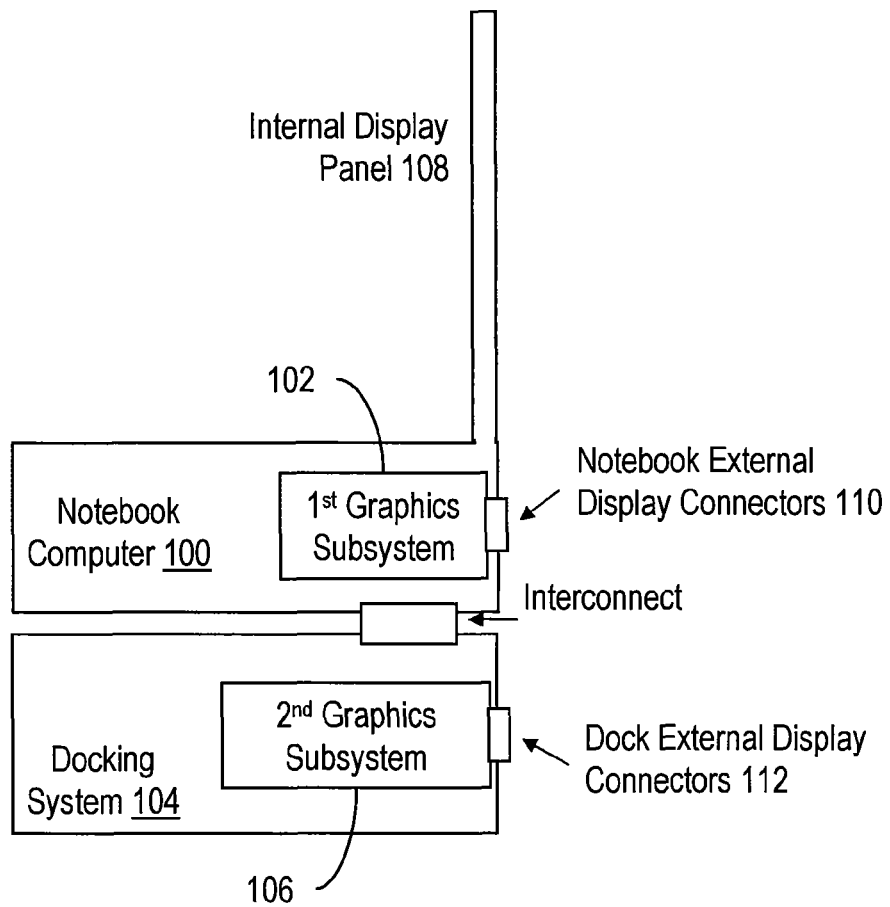
FIG. 1A is a simplified system diagram illustrating a mobile device with a first graphics subsystem and a docking system with a second graphics subsystem.

FIG. 1A is a simplified system diagram illustrating a mobile device, such as a notebook computer 100, with a first graphics subsystem 102 and a docking system 104 with a second graphics subsystem 106. The notebook computer 100 has its own internal display panel 108 and also notebook external display connectors 110 to attach to an external display device. Similarly, the docking system 104 also has its own dock external display connectors 112. Here, the notebook computer 100 is shown to connect to the docking system 104 in a wired interconnect. Some examples of the wired interconnect include, without limitation, Peripheral Component Interconnect ("PCI") Express Graphics ("PEG") port and Mobile PCI Express Module ("MXM") 2.0. Alternatively, this interconnect can be wireless, as long as it supports sufficient bandwidth. According one aspect of the present invention, after the attachment of the docking system 104 to the notebook computer 100, without needing to restart any application currently operating on the notebook computer 100, the notebook computer 100 dynamically switches to the second graphics subsystem 106 and enables any such application to take advantage of the capabilities supported by the second graphics subsystem 106. According to another aspect of the present invention, after the removal of the docking system 104 from the notebook computer 100, without needing to reboot the notebook computer 100, the notebook computer 100 dynamically and seamlessly switches back to the first graphics subsystem 102.

Figure 1B:
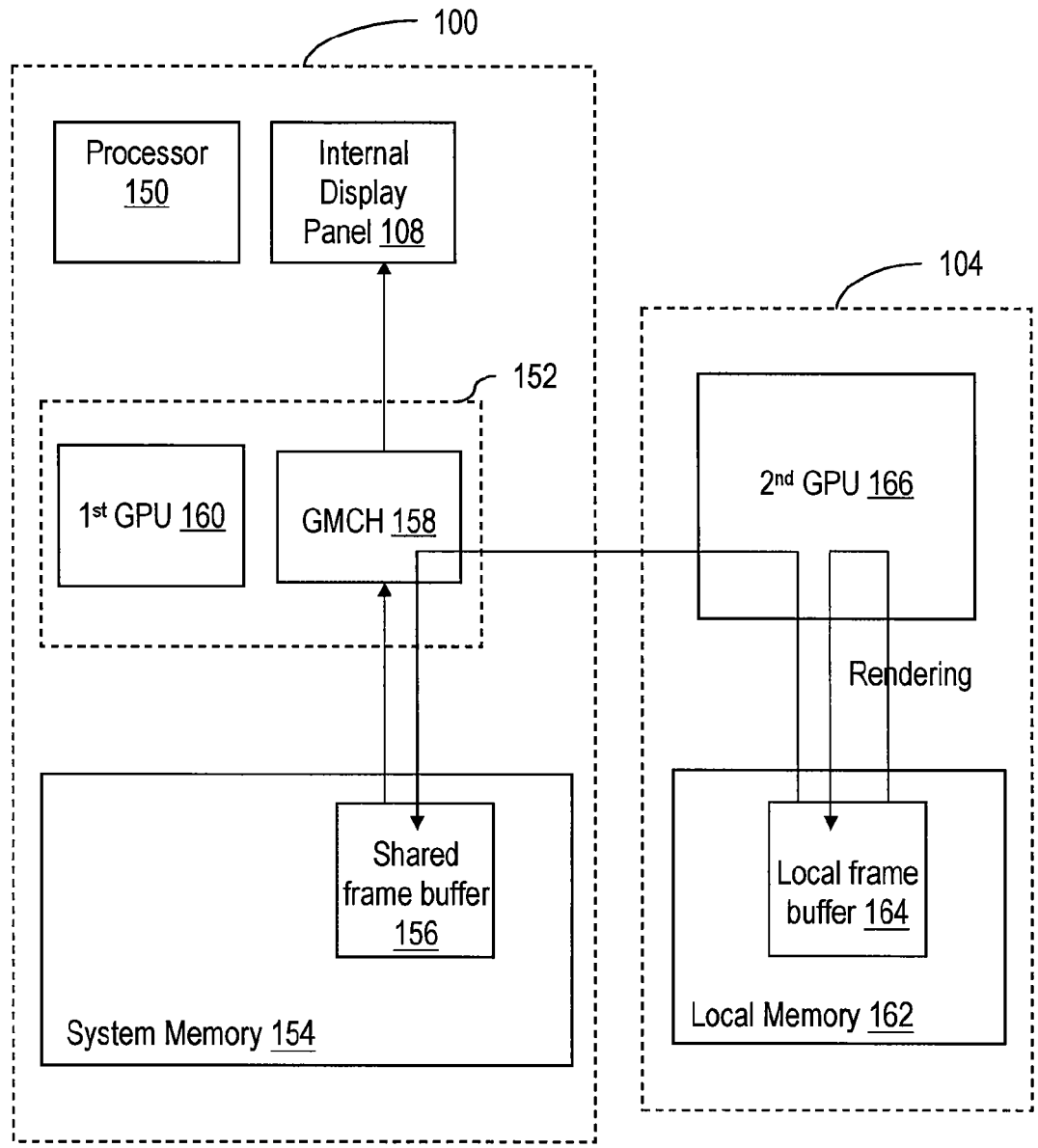
FIG. 1B is a simplified block diagram of some components in the notebook computer and the docking system of FIG. 1A that enable dynamic switching from one graphics subsystem to another, according to one embodiment of the present invention.

FIG. 1B is a simplified block diagram of some components in the notebook computer 100 and the docking system 104 of FIG. 1A that enable dynamic switching from one graphics subsystem to another, according to one embodiment of the present invention. As shown, the notebook computer 100 includes a processor 150, host components 152, system memory 154, and a shared frame buffer 156. The host components 152 further includes a graphics and memory controller hub ("GMCH") 158 and a first graphics processing unit ("GPU") 160 residing in the first graphics subsystem 102 of FIG. 1A. The docking system 104 includes its local memory 162, a local frame buffer 164, and a second GPU 166 that resides in the second graphics subsystem 106 of FIG. 1A.

The system memory 154 in the notebook computer 100 stores programming instructions and data for the processor 150 and the host components 152 to execute and operate on. In other implementations, the processor 150, the first GPU 160, the GMCH 158, or any combination thereof, may be integrated into a single processing unit. Further, the functionality of the first GPU 160 may be included in the GMCH 158 or in some other type of special purpose processing unit or co-processor. In such embodiments, software instructions may reside in other memory systems than the system memory 154 and may be executed by processing units other than the processor 150. It should also be apparent to a person with ordinary skills in the art to recognize that the GMCH 158 may include multiple discrete integrated circuits that work together to serve different types of I/O agents, such as a northbridge and a southbridge.

After the notebook computer 100 is coupled to the docking system 104 and the second GPU 166 is configured to render objects for the notebook computer 100, in one implementation, the second GPU 166 renders objects to the local frame buffer 164 and copies the rendered objects from the local frame buffer 164 to the shared frame buffer 156 via the interconnect between the GMCH 158 and the second GPU 166. Then, the first GPU 160 ensures the data in the shared frame buffer 156 is scanned out to the internal display panel 108 for display. On the other hand, after the notebook computer 100 is detached from the docking system 104 and the first GPU 160 is configured to render objects for the notebook computer 100, in one implementation, the first GPU 160 renders objects to the shared frame buffer 156 and also scans out the data in the shared frame buffer 156 to the internal display panel 108.

Figure 1C:
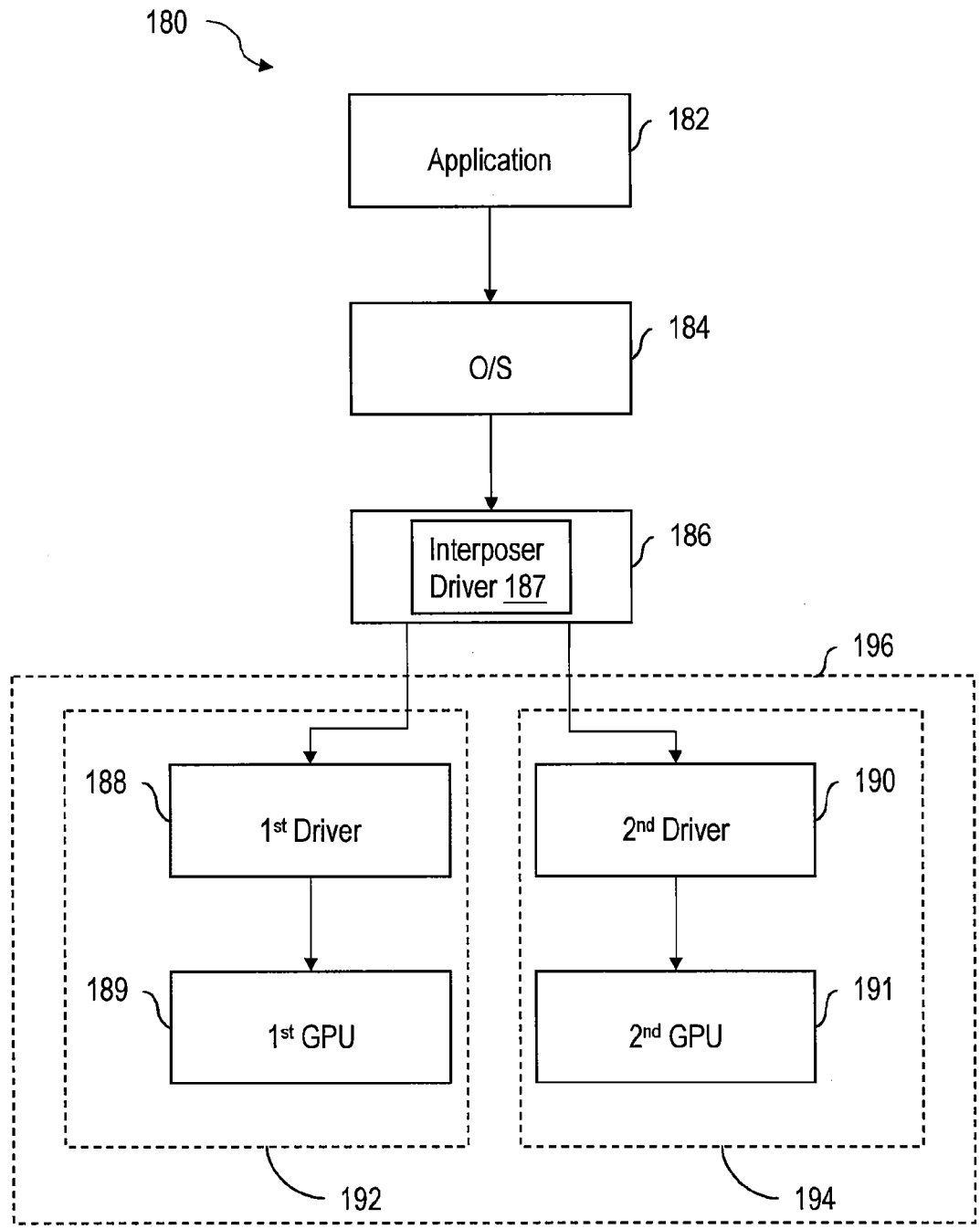
FIG. 1C is a software stack configured to support the dynamic modification of graphics capabilities of a mobile device, according to one embodiment of the present invention.

FIG. 1C is a software stack 180 configured to support the dynamic modification of graphics capabilities of a mobile device, according to one embodiment of the present invention. As shown, the software stack 180 includes a software layer 186 disposed between an application 182 and a plurality of drivers, such as a first driver 188 and a second driver 190. The application 182 operates on top of an operating system (O/S) 184. Using the system configurations illustrated in FIGS. 1A and 1B as an example, the O/S 184 refers to the O/S for the notebook computer 100. A first driver 188 in one implementation is a graphics driver adapted for interfacing a first GPU 189, corresponding to the first GPU 160 of FIG. 1B, and the second driver 190 is also a graphics driver adapted for interfacing a second GPU 191, corresponding to the second GPU 166. The combination of the driver and the GPU is referred to as a sub-system. Thus, the first driver 188 with the first GPU 189 is a sub-system 192, and the second driver 190 with the second GPU 191 is a sub-system 194. The software layer 186 is mainly responsible for wrapping both of these sub-systems 192 and 194 so that they appear as a single graphics subsystem 196 to the O/S. In one implementation, the software layer 186 includes an interposer driver 187, which is responsible for managing all the graphics function calls of the sub-systems 192 and 194.

Figure 2A:
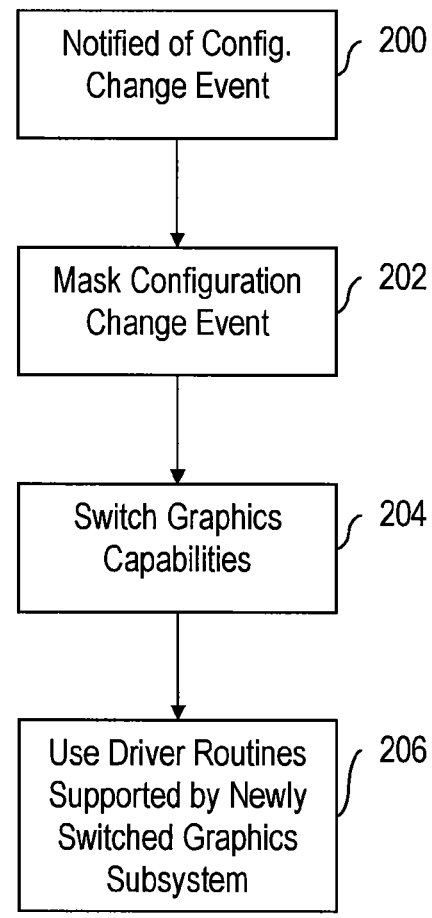
FIG. 2A is a flow chart illustrating one process for a software layer to dynamically modify the graphics capabilities of a mobile device, according to one embodiment of the present invention.

FIG. 2A is a flow chart illustrating one process for the software layer 186 to dynamically modify the graphics capabilities of a mobile device, according to one embodiment of the present invention. To avoid unnecessarily obscure the following discussions, the software stack 180 of FIG. 1C is assumed to operate on the notebook computer 100 shown in the system configurations of FIGS. 1A and 1B, and the illustrated process of FIG. 2A is described mainly from the perspective of the interposer driver 187. However, it should be apparent to a person with ordinary skills in the art to include additional drivers in the software layer 186.

Whenever the notebook computer 100 detects a removal event (e.g., the docking system 104 detaching from the notebook computer 100) or an attachment event (e.g., the docking system 104 attaching to the notebook computer 100), an interrupt is issued to the O/S 184 of the notebook computer 100. In response to the interrupt, the O/S 184 in step 200 notifies the interposer driver 187 of this configuration change event. The interposer driver 187 then masks this event in step 202 to induce a subsequent reset event. As mentioned above, the O/S 184 only recognizes the interposer driver 187 interfacing with the graphics subsystem 196 and does not know about the existence of the sub-systems 192 and 194 shown in FIG. 1C. So, from the perspective of the O/S 184, the reset event is associated with the resetting of the graphics subsystem 196. To properly mask the configuration change event from the O/S 184 and also the various drivers, one implementation of the software layer 186 not only manages communications between the O/S 184 and the drivers, but it also controls signaling for certain hardware components in the notebook computer 100. Subsequent paragraphs will further detail the masking mechanisms.

After the occurrence of the reset event, in step 204, the interposer driver 187 switches the graphics capabilities of the notebook computer 100 of FIG. 1A and FIG. 1B to match the ones supported by the preferred graphics subsystem that is still accessible to the notebook computer 100. So, suppose the notebook computer 100 is attached to the docking system 104. After the removal event for the docking system 104, the second GPU 166 of FIG. 1B (corresponding to the second GPU 191 of FIG. 1C) is physically detached from the notebook computer 100. The interposer driver 187 is responsible for switching the graphics capabilities of the notebook computer 100 to match the ones supported by the first GPU 160 of FIG. 1B (corresponding to the first GPU 189 of FIG. 1C), because the first GPU 160 is the only one accessible by the notebook computer 100 in this example. On the other hand, if the docking system 104 reattaches to the notebook computer 100, then the interposer driver 187 switches the graphics capabilities of the notebook computer 100 back to match the ones supported by the second GPU 166, because the second GPU 166 offers more superior graphics capabilities than the first GPU 160.

Moreover, the interposer driver 187 is also responsible for routing calls from the application 182 shown in FIG. 1C to use the driver routines of the newly switched graphics subsystem in step 206. So, if the docking system 104 is detached from the notebook computer 100, then the interposer driver 187 routes calls made by the application 182 to the first driver 188, the internal driver of the notebook computer 100 that interfaces with the first GPU 189. Conversely, if the docking system 104 is attached to the notebook computer 100, then the interposer driver 187 routes calls made by the application 182 to the second driver 190, the driver residing in the docking system 104 that interfaces with the second GPU 191.

Figure 2B:
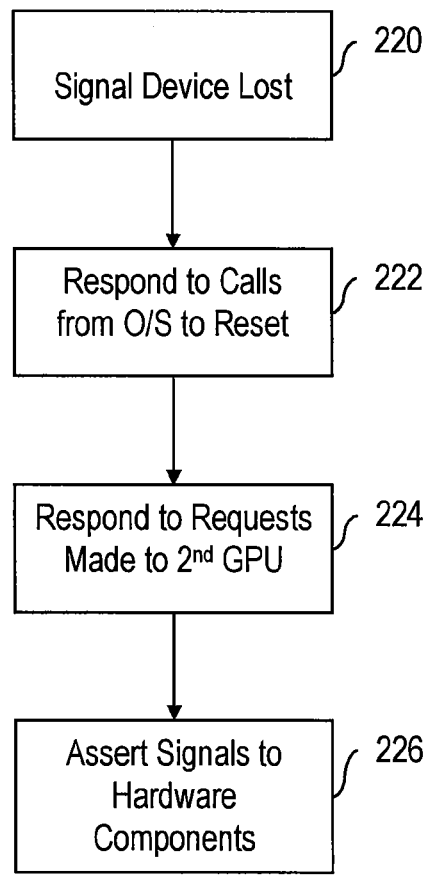
FIG. 2B is a flow chart illustrating the method steps for masking the aforementioned configuration change event, according to one embodiment of the present invention.

FIG. 2B is a flow chart illustrating the method steps for masking the aforementioned configuration change event, according to one embodiment of the present invention. Similar to the discussions above, using the interposer driver 187 of FIG. 1C as an illustration, when the removal event for the second GPU 191 occurs, the interposer driver 187 intercepts the interrupt and signals a device lost event to the O/S 184 in step 220. This device lost event indicates to the O/S 184 that the graphics subsystem 196, not the second GPU 191, needs to be reset. Then in step 222, the interposer driver 187 intercepts the call from the O/S 184 and returns a value indicating the successful reset of the graphics subsystem 196. In other words, from the perspective of the O/S 184, the O/S 184 does not know about the removal of the second GPU 191 but receives confirmation that a reset event has take place. In one implementation, the interposer driver 187 resets the parameters associated with the second GPU 191. Moreover, the interposer driver 187 also intercepts requests that are made to the second GPU 191 in step 224, because the second GPU 191 is no longer accessible. In some instances, the interposer driver 187 also asserts control signals in step 226 to stop the generation of certain signals associated with the removal of the second GPU 191. The steps described above also apply to the attachment event of the second GPU 191. In other words, after the interposer driver 187 intercepts the interrupt associated with the attachment event, one implementation interposer driver 187 still signals to the O/S 184 a device lost event in step 220 and similarly shields this configuration change from the O/S 184.

Figure 2C:
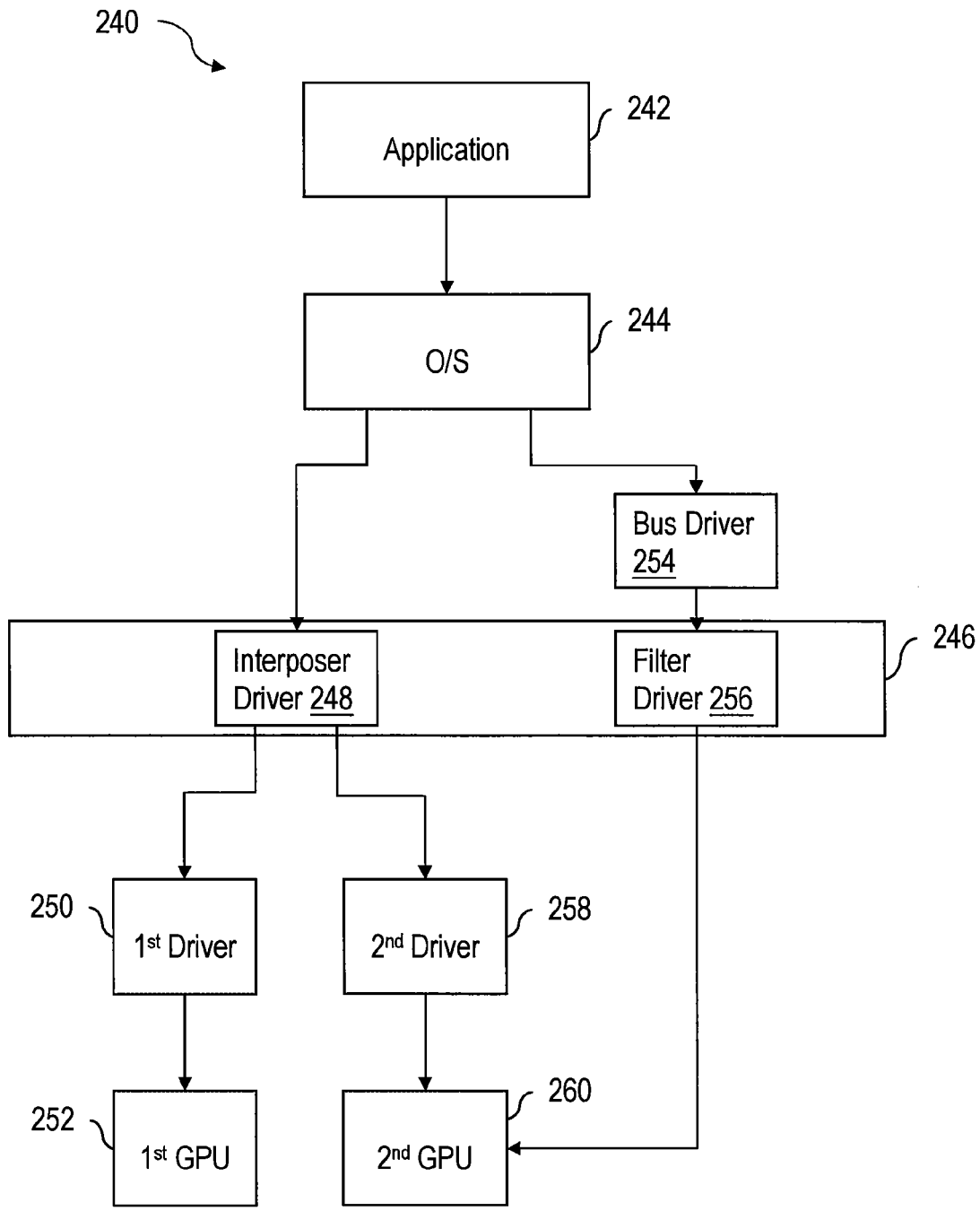
FIG. 2C is a software stack configured to handle multiple aspects of a configuration change event, according to another embodiment of the present invention.

It should be apparent to a person with ordinary skills in the art to recognize that to fully mask a configuration change event, other aspects of the event, in addition to what is disclosed above, also need to be addressed. FIG. 2C is a software stack 240 configured to handle multiple aspects of a configuration change event, according to another embodiment of the present invention. As noted above, a software layer 246 of the software stack 240 includes more than one driver, such as an interposer driver 248 and a filter driver 256 shown in FIG. 2C. Here, the interposer driver 248 behaves in the same manner as the interposer driver 187 illustrated in FIG. 1C and described above. Suppose the configuration change event is the removal of the second GPU 260. A bus driver 254 is typically configured to have direct access to an adapter card containing the second GPU 260 and handle tasks such as bus enumeration and Advanced Configuration and Power Interface ("ACPI"). The bus driver 254 is also generally notified of the removal event. In one implementation, the filter driver 256 is disposed between the bus driver 254 and the hardware to intercept the interrupt caused by the adapter card removal and keep such information away from the bus driver 254. In addition, the filter driver 256 also intercepts any request issued from or through the bus driver 254 to the adapter card containing the second GPU 260.

Figure 2D:
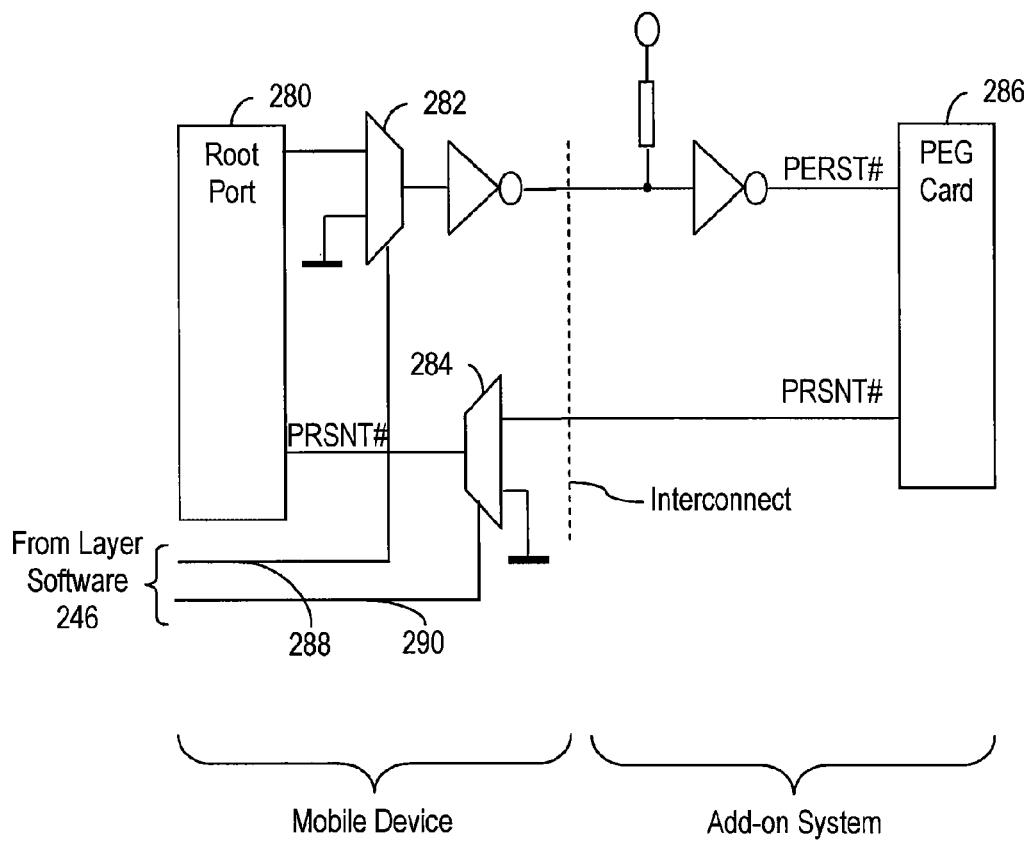
FIG. 2D is a simplified block diagram illustrating how a software layer in a mobile device manipulates signals for a PEG card residing in an add-on system, according to one embodiment of the present invention.

In conjunction with the masking process illustrated in FIG. 2B and the software stack 240 of FIG. 2C, suppose the adapter card containing the second GPU 260 is a PEG card and is coupled to the PEG port of a GMCH, such as the GMCH 158 shown in FIG. 1B. FIG. 2D is a simplified block diagram illustrating how the software layer 246 in a mobile device manipulates signals for a PEG card residing in an add-on system, according to one embodiment of the present invention. Here, the mobile system, such as the aforementioned notebook computer 100, includes a root port 280, a first selector 282, and a second selector 284. Also, the add-on system, such as the aforementioned docking system 104, includes a PEG card 286 that contains the second GPU 260 with superior graphics capabilities. If the PEG card 286 is removed, as shown in step 226 of FIG. 2B and discussed above, the interposer driver 248 in the software layer 246 asserts a select signal 290 to overwrite the PRSNT# signal, so that the root port 280 does not detect the removal. In addition, the interposer driver 248 also asserts a select signal 288 to send the appropriate reset signal (i.e., PERST#) to the PEG card 286.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the above examples, embodiments, and drawings should not be deemed to be the only embodiments, and are presented to illustrate the flexibility and advantages of the present invention as defined by the following claims.

I claim:

1. A method for dynamically modifying the graphics capabilities of a mobile device, the method comprises:
abstracting the handling of a first graphics subsystem and a second graphics subsystem associated with the mobile device, so that the first graphics subsystem and the second graphics subsystem appear as a third graphics subsystem to an operating system for the mobile device;

detecting a configuration change event corresponding to the second graphics subsystem;
masking the configuration change event to induce the generation of a reset event; and
modifying the graphics capabilities of the mobile device to match the highest graphics capabilities between the first graphics subsystem and the second graphics subsystem that are accessible to the mobile device.

2. The method of claim 1, wherein the masking step further comprising signaling a device lost event to the operating system.

3. The method of claim 2, further comprising responding to a call associated with the reset event from the operating system.

4. The method of claim 3, further comprising:
intercepting the call from the operating system to reset the third graphics subsystem; and
indicating to the operating system a successful completion of the reset event.

5. The method of claim 4, further comprising resetting the first graphics subsystem.

6. The method of claim 1, wherein the masking step further comprising intercepting a request destined for the second graphics subsystem.

7. The method of claim 1, wherein the masking step further comprising asserting a selection signal to override a status signal, wherein the status signal can alert the operating system of the configuration change event.

8. The method of claim 1, wherein detecting a configuration change event corresponding to the second graphics subsystem comprises detecting a change in whether the second graphics subsystem is available to render objects for the first graphics subsystem to display.

9. A non-transitory computer-readable medium containing a sequence of instructions for a software layer, which when executed by a processor in a mobile device, causes the processor to:
abstract the handling of a first graphics subsystem and a second graphics subsystem associated with the mobile device, so that the first graphics subsystem and the second graphics subsystem appear as a third graphics subsystem to an operating system for the mobile device;
detect a configuration change event corresponding to the second graphics subsystem;
mask the configuration change event to induce the generation of a reset event; and
modify the graphics capabilities of the mobile device to match the highest graphics capabilities between the first graphics subsystem and the second graphics subsystem that are accessible to the mobile device.

10. The computer-readable medium of claim 9, further containing a sequence of instructions for the software layer to mask the configuration change event, which when executed by the processor, causes the processor to further signal a device lost event to the operating system.

11. The computer-readable medium of claim 10, further containing a sequence of instructions for the software layer, which when executed by the processor, causes the processor to respond to a call associated with the reset event from the operating system.

12. The computer-readable medium of claim 11, further containing a sequence of instructions for the software layer, which when executed by the processor, causes the processor to:
intercept the call from the operating system to reset the third graphics subsystem; and
indicate to the operating system a successful completion of the reset event.

13. The computer-readable medium of claim 12, further containing a sequence of instructions for the software layer, which when executed by the processor, causes the processor to reset the first graphics subsystem.

14. The computer-readable medium of claim 9, further containing a sequence of instructions for the software layer to mask the configuration change event, which when executed by the processor, causes the processor to intercept a request destined for the second graphics subsystem.

15. The computer-readable medium of claim 9, further containing a sequence of instructions for the software layer to mask the configuration change event, which when executed by the processor, causes the assertion of a selection signal that overrides a status signal, wherein the status signal can alert the operating system of the configuration change event.

16. The computer-readable medium of claim 9, wherein the software layer is disposed between the operating system and a plurality of graphics drivers that are responsible for the first graphics subsystem and the second graphics subsystem.

17. The computer-readable medium of claim 9, wherein the software layer is disposed between a device driver and the first graphics subsystem.

18. The computer-readable medium of claim 9, wherein detecting a configuration change event corresponding to the second graphics subsystem comprises detecting a change in whether the second graphics subsystem is available to render objects for the first graphics subsystem to display.

19. A mobile device, comprising:
a system memory,
a first graphics subsystem, and
a processor configured to:
abstract the handling of the first graphics subsystem and a second graphics subsystem in an add-on system to the mobile device, so that the first graphics subsystem and the second graphics subsystem appear as a third graphics subsystem to an operating system for the mobile device;
detect a configuration change event corresponding to the second graphics subsystem;
mask the configuration change event to induce the generation of a reset event; and
dynamically modify the graphics capabilities of the mobile device to match the highest graphics capabilities between the first graphics subsystem and the second graphics subsystem that are accessible to the mobile device.

20. The mobile device of claim 19, wherein the processor is further configured to signal a device lost event to the operating system.

21. The mobile device of claim 20, wherein the processor is further configured to respond to a call associated with the reset event from the operating system.

22. The mobile device of claim 19, wherein the processor is further configured to intercept a request destined for the second graphics subsystem.

23. The mobile device of claim 19, wherein:
under a first configuration, the second graphics subsystem renders objects to a local frame buffer, and the first graphics subsystem ensures that the objects in the local frame buffer are displayed; and
under a second configuration, the first graphics subsystem renders objects to the local frame buffer and ensures that the objects in the local frame buffer are displayed.

* * * * *